(12) United States Patent
Laigneau et al.

(10) Patent No.: US 7,444,924 B2
(45) Date of Patent: Nov. 4, 2008

(54) COFFEE-MAKER COMPRISING AN IMPROVED LOCKING DEVICE

(75) Inventors: Gilles Laigneau, Damigny (FR); Christian Jouatel, Radon (FR)

(73) Assignee: SEB S.A., Ecully (FR)

(*) Notice: Subject to any disclaimer, the term of this patent is extended or adjusted under 35 U.S.C. 154(b) by 570 days.

(21) Appl. No.: 10/520,947

(22) PCT Filed: Jul. 11, 2003

(86) PCT No.: PCT/FR03/02190

§ 371 (c)(1),
(2), (4) Date: Jan. 12, 2005

(87) PCT Pub. No.: WO2004/006741

PCT Pub. Date: Jan. 22, 2004

(65) Prior Publication Data

US 2006/0048650 A1 Mar. 9, 2006

(30) Foreign Application Priority Data

Jul. 12, 2002 (FR) .................................. 02 08788

(51) Int. Cl.
*A47J 31/58* (2006.01)
*A47J 31/40* (2006.01)
*A47J 31/52* (2006.01)

(52) U.S. Cl. .......................... 99/280; 99/295; 99/302 R

(58) Field of Classification Search ................... 99/295, 99/329 R, 302 R, 280, 279
See application file for complete search history.

(56) References Cited

U.S. PATENT DOCUMENTS

| 3,292,527 | A | | 12/1966 | Strasse |
| 5,642,656 | A | | 7/1997 | Braendle |
| 6,009,792 | A | * | 1/2000 | Kraan ......................... 99/295 |
| 6,142,063 | A | * | 11/2000 | Beaulieu et al. .............. 99/283 |
| 6,240,831 | B1 | | 6/2001 | Rolfes |

OTHER PUBLICATIONS

WO 02/24043 Patenotre et al. Mar. 2002.*

* cited by examiner

*Primary Examiner*—Reginald L Alexander
(74) *Attorney, Agent, or Firm*—Browdy and Neimark, PLLC

(57) ABSTRACT

The invention concerns a cartridge-operated coffee-machine, comprising a two-part housing (1) for receiving hot water supply means for an infusion head (8): one first part forming a support for at least one cartridge (2) and a mobile part for opening and closing said infusion head (8), the two parts being spaced apart by elastic return means (14), a locking device (24) for maintaining the infusion head (8) closed countering said return means and means for setting infusion parameters designed to transmit at least one signal representing the operating conditions of the machine. The invention is characterized in that it comprises means for controlling the opening of said locking device following the signal transmitted by said setting means.

13 Claims, 4 Drawing Sheets

COFFEE-MAKER COMPRISING AN IMPROVED LOCKING DEVICE

The present invention relates to an apparatus for preparation of hot beverages starting from prepackaged cartridges of soluble or percolation foodstuffs, such as ground coffee, tea or soluble powders.

An apparatus for preparation and distribution of hot beverages generally comprises a cold water tank, an electric pump, a unit forming a boiler and an infusion head that receives the cartridges in order to inject therein hot water coming from said boiler, the beverage obtained being then directed towards a collecting container. At the end of the infusion cycle, the infusion head must be open in order to be able to insert therein a new product cartridge to replace that already used.

One knows in the art manual machines where the cartridge is inserted in a cartridge holder of the spoon type assembled then to the case of the machine by the user, by a fastening of the bayonet type or other; one also knows automatic machines where the insertion of a new cartridge, as well as the ejection of the exhausted cartridge are done without the intervention of the user, but these machines call upon rather complex and cumbersome mechanisms of actuation.

In addition, document EP 0 151 252 describes a coffee-maker comprising an infusion head in two parts: a fixed lower part for reception of a prepackaged cartridge containing coffee and an upper part forming a movable lid. The movable lid carries the body for perforating the cartridge and injection of water inside the latter, this lid being mounted to be movable about a hinge under the force of a spring which facilitates lifting of the lid. Actuation of the lid into the closing position is done manually by the user, as well as that of the opening which is not very practical, even being able to involve risks of burns at the end of the infusion cycle.

In the same manner, the U.S. document Pat. No. 5,794,519 describes a coffee-maker functioning with packaged coffee cartridges, where the infusion head also comprises two parts: one lower for reception of a cartridge and one upper pivoting around a hinge forming part of the case of the machine. The user presses on an operating lever located at the end of the upper part and closes the infusion chamber in order to thus be able to begin an infusion cycle. At the end of the cycle, the user raises the same lever in order to allow the exhausted cartridge to be ejected. Aside from the not very convenient opening actuation, the time of opening is left to the judgment of the user. Because of this, opening before the end of the infusion cycle can prove to be dangerous for the user, because hot infusion water discharges could occur, whereas an opening a long time after lengthens the infusion cycles, which harms the quality of the coffee in the cup and also the rate of making the coffee, if several coffee batches are to be produced successively.

The goal of the invention is to eliminate at least partly these disadvantages and to propose a coffee-maker of the type functioning with cartridges of a product to be infused of simple construction and reliable operation, easy to handle, while making it possible to obtain a beverage of good quality.

Another goal of the invention is to optimize the construction and the arrangement of the locking device for the infusion head of such a coffee-maker, while reducing its size and its manufacturing cost, all while conferring an increased safety for the user when he uses the machine.

These goals are reached with a coffee-maker able to function with cartridges, comprising a case for reception of means for supplying hot water to an infusion head in two parts: a fixed part forming a support for at least one cartridge and a movable part to open and close said infusion head, the two parts being maintained spaced apart by first elastic restoring means, a locking device to maintain the infusion head closed in opposition to said restoring means and means for adjusting the infusion parameters adapted to emit at least one signal representative of the operating condition of the machine, by the fact that it has means for controlling the opening of said locking device at the end of a signal emitted by said adjusting means.

Thus, the two parts of the infusion head are in a normally open position while being maintained spaced apart by first restoring means. These restoring means are, for example, one or more torsion or tension springs, etc, mounted between the two parts of the infusion head.

The closing of the infusion head is done at the beginning of an infusion cycle, after the introduction of the cartridges inside the housing provided for this purpose in the infusion head. This closing can be realized manually by the user or automatically by a mechanism for driving the movable part. An infusion cycle is started thereafter, this infusion cycle being characterized by certain operating parameters: temperature, time, intensity of the current absorbed by the heater or by the pump, etc. The machine has means for adjustment of these parameters and/or means, such as for example a micro-controller, ensuring the management of these parameters.

Once the infusion cycle ends, said means for adjustment detects a value of the parameters of operation which signifies the end of the infusion cycle. Thereafter, these means for adjustment transmit to the locking device a command for opening the upper part of the infusion head, opening which is carried out automatically, without the intervention of the user. The opening of the infusion head can be also controlled when said means for adjustment detect a critical event related to faulty operation of one of the components of the machine, or when they detect the absence of a cartridge inside the infusion head, or the exceeding of a limiting value of a preestablished parameter, or any other event that could harm the correct operation of the machine.

This allows a safe operation for the user, the opening occurring automatically once the beverage is infused, even, at the limit, when an infusion cycle cannot start under good conditions. In addition, the beverage is thus obtained at a good temperature, corresponding to a predetermined volume of beverage in the cup, according to an optimal operation of the machine. Once the infusion chamber is opened, the machine is ready to start again a new cycle of coffee preparation, which ensures a good rate of the infusion cycles, while thus avoiding all the idle periods.

Advantageously, said locking device has a locking part movable between a locked position and an unlocked position by being actuated by an electromagnet controlled by said control means.

Thus, with only one locking part and one electromagnet, one manages to obtain an automatic opening device for the infusion head of the machine which is of simplified construction and small overall dimensions. This thus avoids calling upon complex mechanisms of the clockworks type which open when a time interval has elapsed or any other type of combined movement mechanism that is mechanically actuated.

Preferably, the movable part of the infusion head is a jaw pivotably mounted with respect to a pivot axis of the case and said locking device has a movable locking part pivotable around an axis parallel to the pivot axis of said jaw.

One could have considered the operation of such a locking device with an infusion head that is slidably movable for example vertical or horizontal, but a pivotably movable jaw ensures a longer path of its end for a relatively weak force exerted around its articulation. In this arrangement, pivoting of the jaw takes place at one of its ends around an articulation supported by the case of the machine, whereas the locking part acts at the opposite end of the jaw.

One then prefers to arrange this locking part in a manner to pivot around an axis parallel to that of the jaw or to the plane of opening of the infusion head. Other solutions could, certainly, be under consideration for displacement of the locking part, for example in translation in a notch of the jaw or in rotation around a protuberant axis of the latter while being perpendicular to the pivot axis of the jaw, etc.

Usefully, said locking device has second elastic restoring means for returning said locking part to the locked position.

The locking device of the machine preferably uses an electromagnet for a double purpose, which thus controls the opening of the infusion head and which allows at the same time the infusion head to be maintained locked at the time of its closing. However, the use of said second elastic restoring means makes it possible to bring back the locking part towards its neutral position corresponding to its closing position. This facilitates closing of the jaw by the user, the locking part immediately coming, under the pressure of the restoring means, in engagement with the corresponding part of the jaw. In addition, this allows, in a simplified alternative, the use of an electromagnet having a single effect which controls only the opening of the jaw, whereas closing is ensured by the second elastic restoring means.

Advantageously, said locking part comprises, in a plane perpendicular to its pivot axis, at a high part, a hook cooperating with a locking pin of the jaw, said hook being prolonged downwards by a lever arm intended to be actuated by said electromagnet.

Thus, this locking part pivots around an axis, preferably median, a hook being provided at the upper end of the locking part to come in engagement with a finger in correspondence with the jaw, whereas its lower end is used for actuation by being connected to the electromagnet. The lever arm thus amplifies the path of the hook, which allows the use of an electromagnet of small size and controlled by a current of low intensity, more economical.

Usefully, said locking part comprises, at the external side of its pivot axis, a projecting part forming an operating button.

Thus, this part projecting towards the outside is used as an operating button for manual opening actuation of the jaw, for example when the electromagnet is not under voltage and when one wishes to open the jaw, to clean the infusion head or before an infusion cycle has been selected, etc.

Advantageously, said lever arm cooperates with a rod crossing the width of the infusion head, said rod cooperating at its end with said electromagnet.

A direct actuation by the electromagnet of the lever arm also being able to be considered, one prefers however to interpose between the two parts an actuation rod. This makes it possible to use an actuation rod for the lever which is very thin and which can cross the infusion head without being cumbersome. One can then place the electromagnet, which itself has larger dimensions than the rod, at the end of the latter, at the interior of the case of the machine and behind the infusion head. This makes it possible to have an automatic device for opening of the jaw which is efficacious, while being very discrete.

Preferably, said control means for said locking device comprise a microcontroller connected to the means for adjustment of the infusion parameters to control said electromagnet as a function of said infusion parameters.

In a simplified alternative, one could consider the use of electromechanical regulation bodies, for example a timer connected to a relay control of the electromagnet when an interval of time has elapsed. As a sub-alternative, one would have been able to associate the use of a thermostat in order to start the timer only if a set temperature, indicating the temperature of water in the boiler, had been reached before starting the timer. One prefers however the use of a microcontroller because it is able to manage in a precise way the set points of several parameters and the values of these parameters measured at precise time intervals and thus to control, more in-depth and reliably, the moment of opening of the infusion head.

Preferably, said microcontroller is connected to at least one sensor representative of the state of an infusion parameter and it manages an infusion cycle according to the evolution of this parameter.

Thus, this sensor can be a flow meter that measures the quantity of water flowing through a cartridge starting from the beginning of an infusion cycle. Pulses transmitted by the flow meter to the microcontroller are then taken into account to control the halting of the infusion water and thereafter the opening of the locking device. The microcontroller could be advantageously connected to a temperature gauge, for example of the resistive type whose value of resistance varies according to its temperature, sensor placed in contact with the boiler. Such a sensor can inform the microcontroller about the quantity of water that passes through the boiler, the latter then controlling the opening of the locking device and/or the operation of the machine. In a simplified version, the microcontroller measures only the time of infusion starting from the moment when one or several set points of the operating parameters have been reached.

Usefully, the coffee-maker of the invention comprises an electrical contact actuated by the opening of said jaw and connected to said microcontroller to enable it to detect the open or closed position of the jaw.

This makes it possible to start an infusion cycle only if the jaw is in the closed position.

Preferably, said microcontroller is connected to a sensor of a critical situation which controls the opening of said jaw when a limit condition of this parameter has been reached.

Thus, the jaw remaining opened, an infusion cycle cannot be carried out if a malfunction of the machine has been reached. This critical situation sensor can advantageously be a temperature sensor indicating the temperature of the boiler, a circuit for measuring the intensity of the current absorbed by the pump, a sensor indicating the presence of the tank or the water level in the latter, etc. In this case, the microcontroller can control the opening of the jaw and/or the switching off of the machine, and/or the indication on a display of the type of malfunction.

The invention will be better understood from a study of the embodiments taken on a nonlimiting basis and illustrated in the annexed figures in which.

Figure 1:
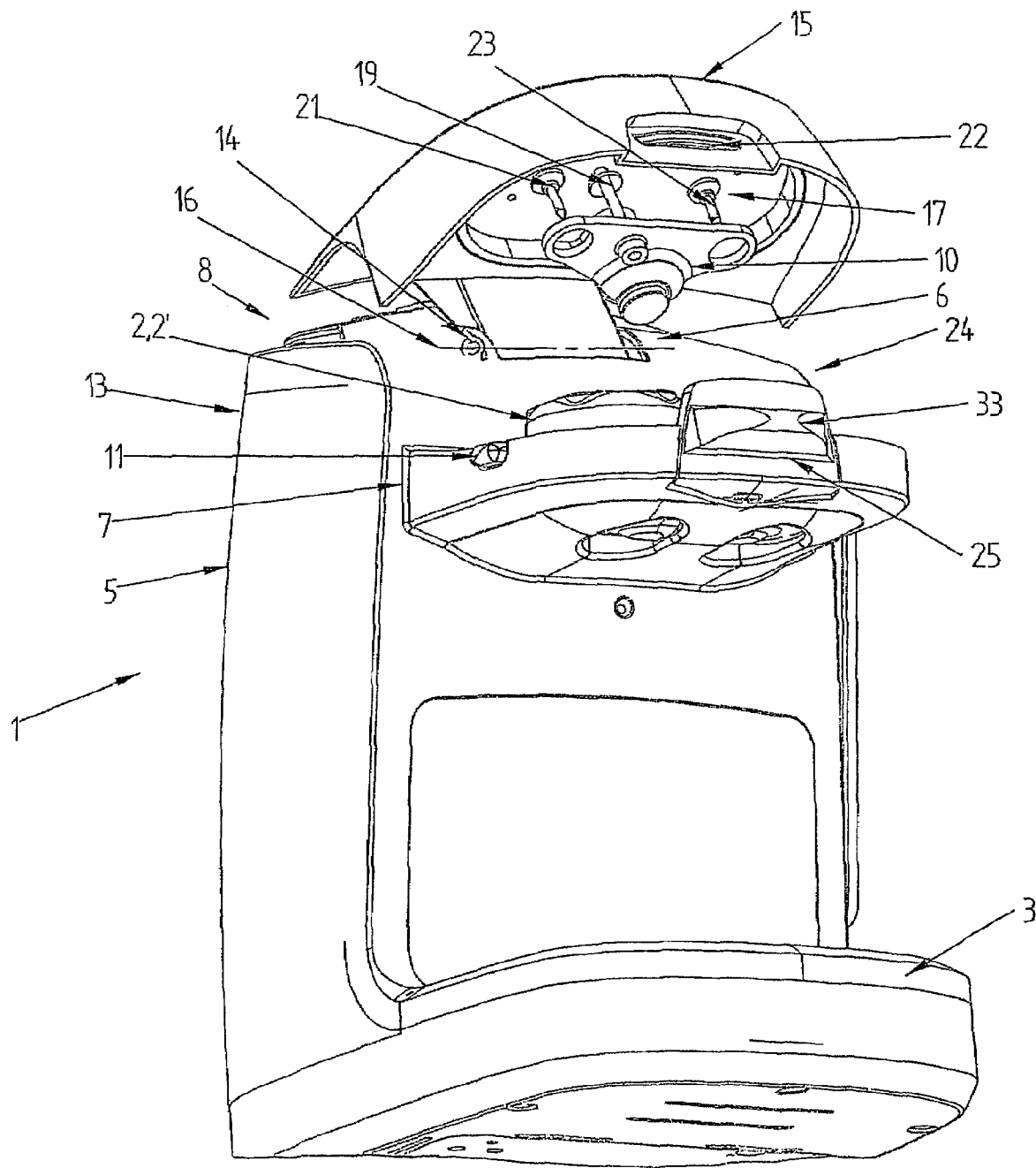
FIG. 1 is a general view in perspective of a coffee-maker according to the invention, in its open position.

As illustrated in FIG. 1, case 1 of the coffee-maker comprises a lower horizontal base 3 completed by a rear vertical upright 5. A horizontal tray 7 is fixed starting from the rear upright at a height allowing the subjacent positioning of a container, such as cup, tumbler or coffeepot.

Figure 2:
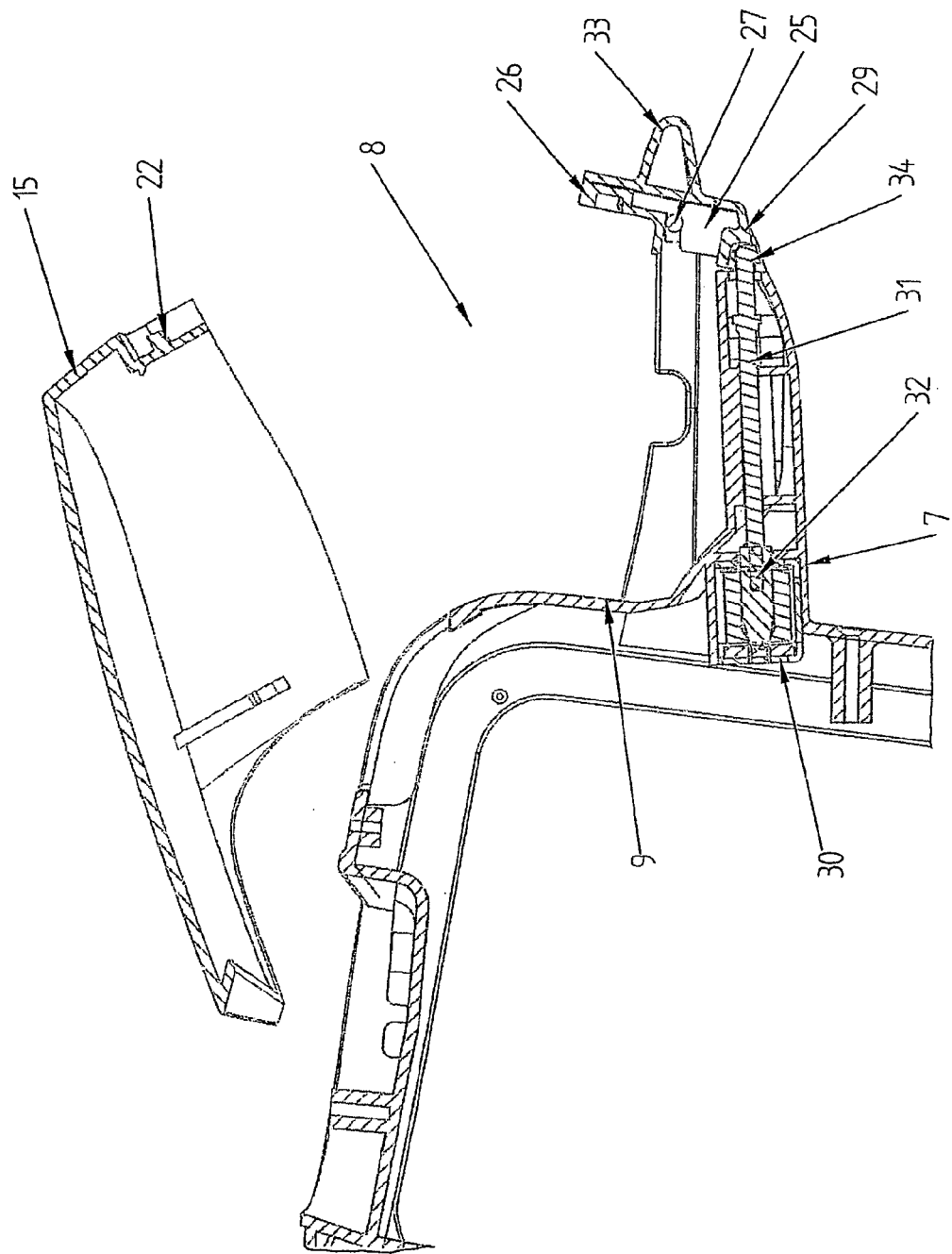
FIG. 2 is a partial axial cross-section of the front part of the machine showing the infusion head in its open position.

As better seen in FIG. 2, the upper face of the frontal end of tray 7 presents a housing 9 in which a removable support 11 for two side-by-side cartridges 2, 2' can be installed.

The anterior end of tray 7 is completed by two side walls 13 supporting in rotation a jaw 15 connected to side walls 13 of tray 7 by a hinge 6. Jaw 15 is brought back to a position spaced from tray 7 by first restoring means 14 which are, in the example shown, in the form of a helical torsion spring integrated into hinge 6 ensuring a large opening of the apparatus when the jaw is in raised position.

The frontal end of jaw 15 has a cross-piece constituting a mounting base 17 for a plurality of needles 19, 21 and 23 directed downwards in the direction of the cartridges. Needles 19, 21, 23 are hollow and present, at one of their ends supported by mounting base 17, an end for connection to a pipe for supplying infusion water, whereas the opposite end presents a point and an opening for injecting water into cartridge 2.

The cartridges are placed in housings provided for this purpose in removable support 11, where a first housing is able to receive a cartridge 2 of ground coffee, whereas the second housing can receive either a cartridge 2' of soluble product of larger dimensions, for example of milk, or a cartridge 2 of ground coffee, the machine being able to function with two different types of cartridges simultaneously. Thus, one notes a longer needle 19 coming in correspondence with a cartridge of large size or special cartridge 2', whereas shorter needles 21, 23 are designed to each come in correspondence with a cartridge of small size or standard cartridge 2. The quantity of water sent through needles 19, 21, 23 varies according to the type of cartridge and the volume of the cup. A device 10 for protection of needles 19, 21, 23 is fixed to mounting base 17 for the needles and it masks the pointed perforation part of the needles when jaw 15 is in open position.

Cartridges 2 are placed in support 11 of housing 9 which form together the fixed part of an infusion head 8. The movable part of the infusion head is represented by jaw 15 carrying needles 19, 21, 23 and the connections to the hot water supply pipes.

In addition the machine has, inside case 1, a pump of the electromagnetic type which sends water from a cold water tank supported by case 1, into a boiler from where hot water passes in the pipes for supplying needles 19, 21, 23 with the aid of solenoid valves controlled by a microcontroller.

According to the invention, the machine has a locking device 24 for jaw 15 in the lowered position which comprises a locking part 25, located at the front end of the lower part of infusion head 8, coming to engage in a corresponding finger 22 arranged in the end of jaw 15.

Locking part 25 is mounted in rotation around a pivot axis 27 located at the front end of housing 9 of infusion head 8. Locking part 25 comprises, in a plane perpendicular to axis 27, above this axis 27, a hook 26 cooperating with finger 22 of locking of jaw 15. Hook 26 is prolonged toward the bottom, on the side opposite to axis 27 by a lever arm 29 intended to be actuated by a rod 31, such will be explained hereafter. In addition, the front face of locking part 25 has a projecting member forming an operating button 33 accessible from outside in order to be able to intentionally open jaw 15.

Figure 4:
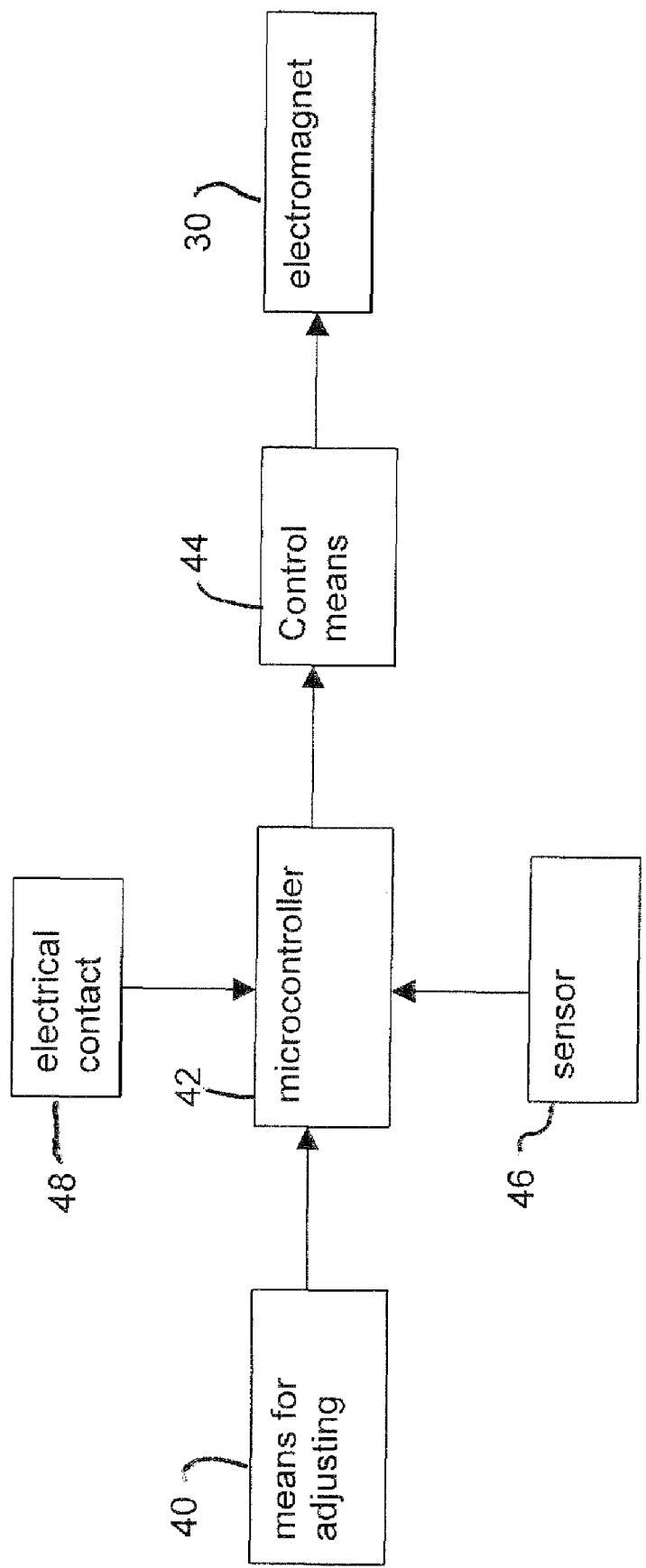
FIG. 4 is a block diagram showing a control arranegement; in a coofee-maker according to the ivention.

More particularly according to the invention, as shown in FIG. 4, the coffee-maker has means 40 for adjustment of the infusion parameters, for example a function selector button connected to a microcontroller 42 that manages the operation of the machine. This microcontroller is connected to control means 44 that act on electromagnet 30 which actuates the locking device 24. A censor 46 can be connected to acrocontroller 42. his sensor can be a flow meter that measures the quantity of water flowing through a cartridge starting from the beginning of an infusion cycle. In addition, an electrical contact 48 actuated by the opening of said jaw is connected to microcontroller 42 to enable it to detect the open or closed position of the jaw.

Electromagnet 30 is mounted adjacent to the end 32 of rod 31 which presents an opposite end 34 in the shape of a hook coming in engagement with a corresponding notch of the arm of lever 29. When electromagnet 30 pushes end 32 of rod 31, locking part 25 pivots around its axis 27 and its hook 26 is locked in finger 22 of jaw 15. Conversely, when electromagnet 30 attracts end 31 of rod 31, locking part 25 pivots in the opposite direction, which releases finger 22 of jaw 15 which returns then towards its raised position under the pushing force of first restoring means 14.

Figure 3:
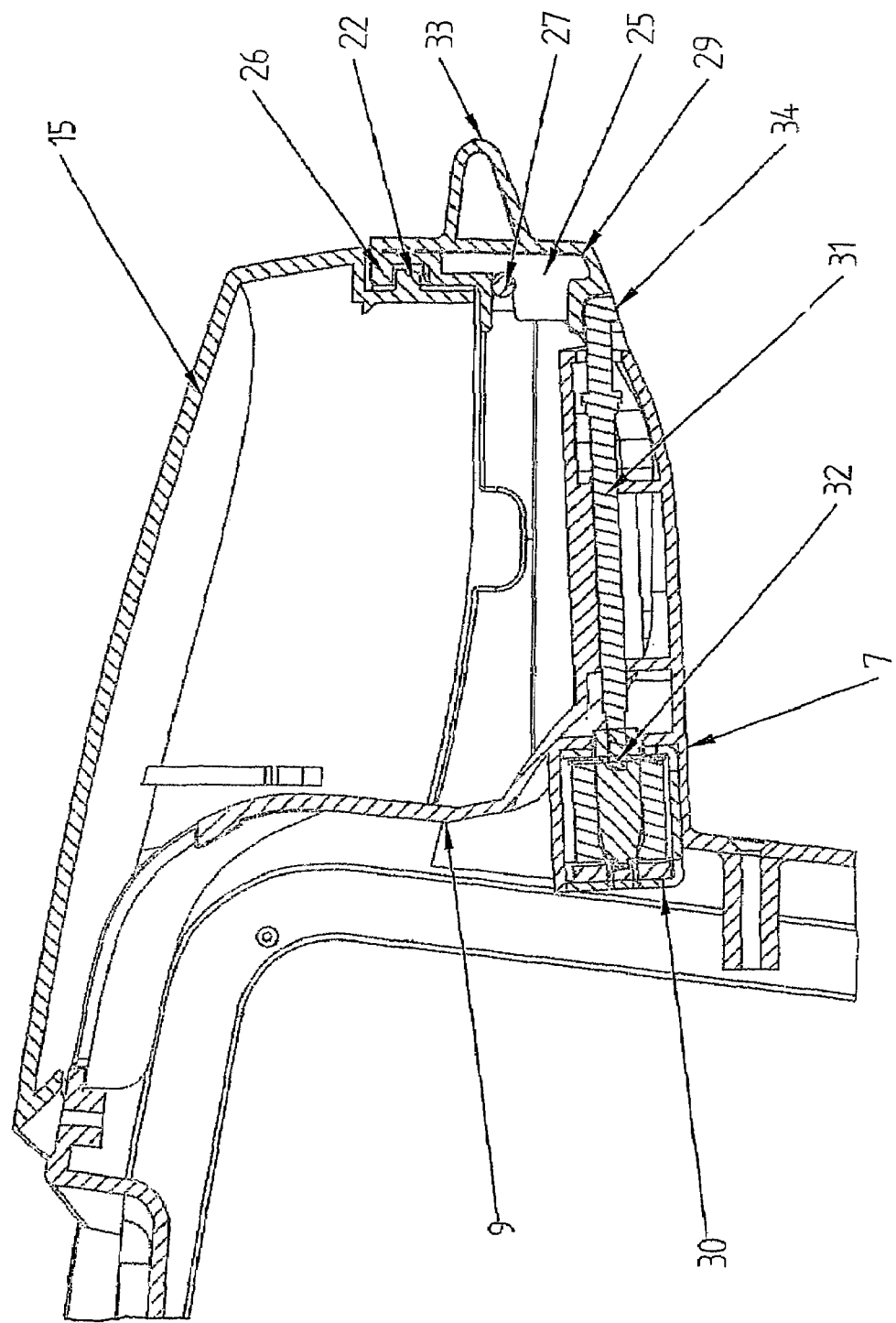
FIG. 3 is a view similar to that of FIG. 2, but with the infusion head in the closed position

The operation of electromagnet 30 is managed by the microcontroller 42 that manages at the same time the infusion cycles of the machine according to the option chosen by the user via a control panel or a function selector button. This microcontroller detects initially the moment of starting of the infusion cycle and transmits a signal to the means 44 for controlling the electromagnet which lock the jaw in the closed position (FIG. 3). Once the infusion cycle ends, the microcontroller transmits a signal to the means for controlling the electromagnet which then open jaw 15.

At the beginning of use, when the function selector button is in a position other than that of water injection, the user presses operating button 33 thus releasing jaw 15 which opens. The user can then put a standard cartridge 2 in a first housing of support 11 of infusion head 8 and a special cartridge 2' in the neighboring housing, if he wishes to make coffee with milk, or two standard cartridges 2 in each of the two housings if he wants to make two black coffees at the same time.

Once the cartridges are installed in the infusion head, the user presses on the frontal part of jaw 15 to cause it to pivot downwards until hook 26 of housing 9 comes to engage in a corresponding finger 22 provided in the end of jaw 15. When jaw 15 descends towards its locked position, needles 19, 21, 23 perforate cartridges 2, 2' and take their places inside the cartridges.

In this position the jaw is locked and the coffee-maker is ready to carry out an infusion cycle. The user turns the coffee-maker on by acting on an on/off button. The heating element is then supplied with current and the boiler heats up quickly. When the temperature sensor indicates that the correct temperature of the boiler has been reached, the user acts on the selector button or the control panel to control a water injection cycle. At this time, locking device 24 is blocked, by the electromagnet, in such a manner as to block any action by the user on button 33 and thus prevent opening of the jaw during this cycle. Infusion water is then sent by the pump through the cartridges 2, 2'. The infused beverage then flows out into one or two collecting container(s).

At the end of the infusion cycle, the microcontroller applies a voltage of the opposite polarity to electromagnet 30 which releases finger 22 and leads to the automatic opening of jaw 15.

Other alternatives and embodiments of the invention can be envisioned without departing from the framework of its claims.

Thus, in an alternative of the invention, the electromagnet has single effect and exerts a locking action during the injection cycle. The machine can in this case have a visual indicator of the LED type, or an audible indicator which informs the user that the coffee is ready and that he can open the machine. In this case, the user actuates an operating button which switches electromagnet 30 off, which releases the finger 22 and leads to the opening of jaw 15.

In another alternative, electromagnet 30 is controlled by a timing unit, as soon as the infusion time chosen by the user or calculated by the microcontroller has elapsed.

In another alternative, electromagnet 30 is controlled during locking of the closed jaw locking by a temperature sensor or any other control body indicating a critical or malfunction state or the machine.

In still another alternative, the electromagnet cannot be energized if a closing condition of the jaw has not been previously detected.

According to another configuration of the machine, it can prove to be useful to have a displacement in translation of the hook of the locking part relative to the finger located in frontal end of the jaw. For this, one can arrange the rotation pivot in the end of the lever arm, the electromagnet then actuating the locking part somewhere between this lower pivot and the hook. One thus obtains a displacement of the upper hook along an arc of a circle of significant radius, which is close to a displacement in translation.

The invention claimed is:

1. Coffee-maker able to function with cartridges, comprising a case (1) for reception of means for supplying hot water to an infusion head (8) in two parts: a fixed part forming a support for at least one cartridge (2) and a movable part to open and close said infusion head (8), the two parts being maintained spaced apart by first elastic restoring means (14), a locking device (24) to maintain the infusion head (8) closed in opposition to said restoring means, means for adjusting the infusion parameters representative of the operating condition of the machine, and a sensor for measuring the quantity of water supplied to the infusion head, said sensor being adapted to emit at least one signal in response to measurement by said sensor of the supply of a predetermined quantity of water to the infusion head, wherein, in operation, the locking device is blocked in a manner to prevent opening of the movable part of the infusion head and said coffee-maker further comprises means for controlling the opening of said locking device in response to the at least one signal emitted by said sensor.

2. Coffee-maker according to claim 1, characterized in that said locking device (24) has a locking part (25) movable between a locked position and an unlocked position by being actuated by an electromagnet (30) controlled by said means for controlling.

3. Coffee-maker according to claim 1, characterized in that the movable part of the infusion head is a jaw (15) pivotably mounted with respect to a pivot axis (16) of the case and said locking device (24) has a movable locking part (25) pivotable around an axis (27) parallel to the pivot axis (16) of said jaw.

4. Coffee-maker according to claim 2, characterized in that said locking device (24) has second elastic restoring means for returning said locking part (25) to the locked position.

5. Coffee-maker according to claim 3, characterized in that said locking part (25) comprises, in a plane perpendicular to its pivot axis (27), at a high part, a hook (26) cooperating with a locking pin (22) of the jaw (15), said hook (26) being prolonged downwards by a lever arm (29) intended to be actuated by said electromagnet (30).

6. Coffee-maker according to claim 5, characterized in that said locking part (25) comprises, at the external side of its pivot axis (27), a projecting part forming an operating button (33).

7. Coffee-maker according to claim 5, characterized in that said lever arm (29) cooperates with a rod (31) crossing the width of the infusion head (8), said rod (31) cooperating at its end (32) with said electromagnet (30).

8. Coffee-maker according to claim 1, further comprising a microcontroller connected between said means for adjusting the infusion parameters to and said means for controlling to control said electromagnet (30) as a function of said infusion parameters.

9. Coffee-maker according to claim 8, characterized in that said microcontroller is connected to at least one sensor representative of the state of an infusion parameter and it manages an infusion cycle according to the evolution of this parameter.

10. Coffee-maker according to claim 8, characterized in that it comprises an electrical contact actuated by the opening of said jaw and connected to said microcontroller to enable it to detect the open or closed position of the jaw.

11. Coffee-maker according to claim 8, characterized in that said microcontroller is connected between said sensor and said means for controlling.

12. Coffee-maker able to function with cartridges, comprising a case (1) for reception of means for supplying hot water to an infusion head (8) in two parts: a fixed part forming a support for at least one cartridge (2) and a movable part to open and close said infusion head (8), the two parts being maintained spaced apart by first elastic restoring means (14), a locking device (24) to maintain the infusion head (8) closed in opposition to said restoring means, means for adjusting the infusion parameters, and a sensor for measuring the quantity of water supplied to the infusion head, said sensor being adapted to emit at least one signal in response to measurement by said sensor of the supply of a predetermined quantity of water to the infusion head, wherein: in operation, the locking device is blocked in a manner to prevent opening of the movable part of the infusion head and said coffee-maker further comprises means for controlling the opening of said locking device in response to the at least one signal emitted by said sensor; the movable part of the infusion head is a jaw (15) pivotably mounted with respect to a pivot axis (16) of the case and said locking device (24) has a movable locking part (25) pivotable around an axis (27) parallel to the pivot axis (16) of said jaw; and said locking part (25) comprises, at the external side of the axis (27) about which the movable locking part (25) is pivotable, a projecting part forming an operating button (33).

13. Coffee-maker able to function with cartridges, comprising a case (1) for reception of means for supplying hot water to an infusion head (8) in two parts: a fixed part forming a support for at least one cartridge (2) and a movable part to open and close said infusion head (8), the two parts being maintained spaced apart by first elastic restoring means (14), a locking device (24) to maintain the infusion head (8) closed in opposition to said restoring means, means for adjusting the infusion parameters, and sensor means for emitting at least one signal representative of the operating condition of the machine, wherein: in operation, the locking device is blocked in a manner to prevent opening of the movable part of the infusion head and the locking device has means for controlling the opening of said locking device in response to a signal emitted by said sensor means; said locking device (24) has a locking part (25) movable between a locked position and an unlocked position by being actuated by an electromagnet (30) controlled by said means for controlling; said locking device (24) has a locking part (25) movable between a locked position and an unlocked position by being actuated by an electromagnet (30) controlled by said means for controlling; said locking part (25) comprises, in a plane perpendicular to its pivot axis (27), at a high part, a hook (26) cooperating with a locking pin (22) of the jaw (15), said hook (26) being prolonged downwards by a lever arm (29) intended to be actuated by said electromagnet (30); and said lever arm (29) cooperates with a rod (31) crossing the width of the infusion head (8), said rod (31) cooperating at its end (32) with said electromagnet (30).

* * * * *